US006372288B1

(12) United States Patent
Meynckens et al.

(10) Patent No.: US 6,372,288 B1
(45) Date of Patent: Apr. 16, 2002

(54) FORMATION OF A REFRACTORY REPAIR MASS

(75) Inventors: Jean-Pierre Meynckens, Villers-Perwin; Léon-Philippe Mottet, Nalinnes, both of (BE)

(73) Assignee: Glaverbel (BE)

( * ) Notice: Subject to any disclaimer, the term of this patent is extended or adjusted under 35 U.S.C. 154(b) by 0 days.

(21) Appl. No.: 09/117,643

(22) PCT Filed: Jan. 28, 1997

(86) PCT No.: PCT/BE97/00011

§ 371 Date: Aug. 3, 1998

§ 102(e) Date: Aug. 3, 1998

(87) PCT Pub. No.: WO97/28099

PCT Pub. Date: Aug. 7, 1997

(30) Foreign Application Priority Data

Feb. 1, 1996 (GB) .............................................. 9604344

(51) Int. Cl.⁷ ................................................. B05D 1/02
(52) U.S. Cl. ....................... 427/140; 427/142; 427/236; 427/422; 427/427; 427/452; 427/453; 106/450; 106/489; 106/313
(58) Field of Search ................................ 427/140, 142, 427/201, 236, 422, 427, 452, 453; 106/450, 489, 313

(56) References Cited

U.S. PATENT DOCUMENTS 5,002,805 A    3/1991   Robyn ........................ 427/304
5,002,910 A    3/1991   Robyn ........................ 501/103
5,202,090 A    4/1993   Zvosec et al. ............... 266/281
5,270,075 A   12/1993   Robyn et al. ................ 427/201

FOREIGN PATENT DOCUMENTS

| CL | 36126 | 10/1988 |
|---|---|---|
| CL | 38559 | 7/1993 |
| DE | 3842252 A1 | 7/1989 |
| DE | 4031403 A1 | 4/1991 |
| GB | 1012197 | 12/1965 |
| GB | 1064402 | 4/1967 |
| GB | 1330894 | 9/1973 |
| GB | 2110200 | 6/1983 |
| GB | 2154228 | 9/1985 |
| GB | 2170191 | 7/1986 |
| GB | 2233323 | 1/1991 |
| GB | 2257136 | 1/1993 |
| WO | 95/23199 | 8/1995 |

*Primary Examiner*—Katherine A. Bareford
(74) *Attorney, Agent, or Firm*—Piper Marbury; Rudnick & Wolfe, LLP; Jerold I. Schneider

(57) ABSTRACT

A ceramic welding process for the formation of a coherent refractory repair mass on a surface of an electrocast refractory material includes providing an electrocast refractory material having a surface to be repaired; providing a first powder mixture comprised of combustible particles, refractory particles, and at least one constituent which enhances production of a vitreous phase in the coherent refractory repair mass; and projecting the first powder mixture in a gas stream containing oxygen against the surface to be repaired so that the combustible particles react with the projected oxygen against the surface in a highly exothermic manner and release sufficient heat of combustion to form a first coherent refractory repair mass.

10 Claims, No Drawings

FORMATION OF A REFRACTORY REPAIR MASS

BACKGROUND OF THE INVENTION

1. Field of the Invention

The present invention relates to the formation of a refractory repair mass, and in particular to the formation of a refractory repair mass on the surface of an electrocast refractory material.

2. Description of the Related Art

Electrocast refractory materials are oxides of certain controlled compositions obtained by fusion at very high temperatures, usually in an electric furnace, and by casting the so-produced molten material into moulds. There are several families of electrocast refractory materials, including zirconia-containing materials such as alumina/zirconia/silica (AZS), of which one brand is available under the trade name Zac, alumina/zirconia/silica/chromium (AZSC) and spinels such as magnesia/alumina and chromic oxide/alumina.

Electrocast refractory materials find use in a number of specialist high temperature applications, for example as refractory blocks for those parts of furnaces which are subjected to severe high temperature operational conditions. These conditions are encountered at various points in the superstructure of a glass melting tank, with especially severe conditions being encountered at the "glass line" (also known as the "flux line"), that is to say at the upper surface of the molten glass.

In the vicinity of the glass line the refractory material of the tank is subjected to direct thermal contact with the hottest layer of liquid glass and immediately above that to thermal contact with the adjacent furnace atmosphere. The liquid and the adjacent gas thus each subject the glass line refractories to substantial but different stresses. As the level of the glass line rises and falls in the course of the production process the refractories in its vicinity undergo significant thermal cycling. In addition to variable thermal stresses occasioned by this cycling, mechanical stresses are imposed by the liquid glass flowing through the tank having a mechanical scouring action.

Despite the high quality of electrocast refractory materials and their excellent suitability for such duties they nevertheless undergo considerable erosion in use. There is accordingly an ongoing need for repairs of the said materials and a requirement for the formed repair itself to be resistant to the severe conditions. Long-term durability of the repair is especially important given that the furnace may be required to operate continuously for a period in excess of ten years.

The present invention is concerned with ceramic welding repairs. "Ceramic welding" is the term that has come to be used for a refractory welding procedure first claimed in our GB patent specification 1330894, in which a mixture of refractory oxide particles and combustible particles is projected in an oxygen-containing gas stream against the surface of a substrate material. The combustible particles, typically finely divided silicon and/or aluminium, serve as fuel for combustion with the oxygen, reacting against the target surface in a highly exothermic manner and releasing sufficient heat of combustion to form a coherent refractory mass. There have been many subsequent patent specifications on ceramic welding, including our later cases GB 2110200 and GB 2170191.

Ceramic welding can be employed for making discrete refractory blocks or for binding refractory pieces together but has mostly been employed for the in situ repair of worn or damaged refractory walls of furnaces such as coke ovens, glass furnaces and metallurgical furnaces. Ceramic welding is particularly well suited to the repair of a hot substrate surface, making repairs possible while the equipment remains substantially at its working temperature and if necessary while the furnace as a whole remains in operation.

It is a well-established practice in ceramic welding that the composition of the ceramic welding mixture be chosen to produce a refractory repair mass which has a chemical composition compatible with and preferably similar to that of the furnace constructional material. It has however been found that merely matching the chemical compositions of the refractory substrate material and the repair, mass may not be sufficient to ensure a durable repair. Even with chemical compatibility there can still be a problem in ensuring a strong and lasting bond between the repair mass and the worn or damaged refractory substrate. The problem tends to increase if the repaired surface is subjected to very high temperatures or to thermal cycling.

Thus attention must also be given to the physical compatibility of the repair mass and the refractory substrate, most particularly with regard to their respective degrees of thermal expansion, which is linked to their crystallinity. In our copending application GB-A-2257136, which relates to the repair of a surface based on a silicon compound, steps are taken to produce in the repair mass during its formation a crystalline lattice which resembles that of the base refractory material, with a view to avoiding the problem of the formed mass becoming separated and detached from the base refractory material. With such silicon-based repair surfaces it is especially important to avoid the formation of a vitreous phase in the repair mass.

SUMMARY OF THE INVENTION

Surprisingly it has now been found that in the case of electrocast materials a feature which is necessary to ensure physical compatibility between the repair surface and the, repair mass is the presence of a vitreous phase. As a result it has been found that high quality durable repairs can be effected at such hostile locations as the glass line in a glass melting tank by ensuring the presence of a vitreous phase in the repair mass.

Thus according to the present invention there is provided a process for the formation of a coherent refractory repair mass on a surface of electrocast refractory material, in which process a powder mixture of combustible particles and refractory particles is projected in an oxygen-containing gas stream against the refractory surface and the combustible particles react against the said surface in a highly exothermic manner with the projected oxygen and thereby release sufficient heat of combustion to form the repair mass, characterised in that the powder mixture includes at least one constituent which enhances the production of a vitreous phase in the repair mass.

The invention also provides a powder mixture for the formation of a coherent refractory repair mass on a surface of electrocast refractory material, which mixture includes combustible particles and refractory particles for projection in an oxygen-containing gas stream against the refractory surface, where the combustible particles react against the said surface in a highly exothermic manner with the projected oxygen and thereby release sufficient heat of combustion to form the repair mass, characterised in that the powder mixture includes at least one constituent which enhances the production of a vitreous phase in the repair mass.

The invention is especially well suited to the repair of an electrocast zirconiferous refractory material, employing a powder mixture which comprises zirconia-containing refractory particles.

According to the invention the powder mixture containing a constituent which enhances the production of a vitreous phase in the repair mass is applied directly to the surface of the electrocast refractory material to be repaired. The presence of a vitreous phase in the repair mass has been found to provide the benefits of improving both the adhesion and maintenance of adhesion of the repair mass to the electrocast refractory surface. The vitreous phase exists in the bonding phase of the mass and resembles the vitreous phase which exists in the refractory material beneath the surface.

A particular advantage is that the vitreous phase expands and contracts in the same way in both the repair mass and the substrate. Moreover in the case of zirconiferous electrocast refractory material the vitreous phase absorbs both the contraction of zirconia ($ZrO_2$) which occurs with the allotropic transformation from the monoclinic form to the quadratic form at around 1100° C., and the expansion which occurs in the reverse direction.

The presence of the vitreous phase reduces the porosity of the repair mass and together with the good dispersion of the zirconia therein enhances its corrosion resistance.

The improved repair masses of the invention thus provide increased reliability of repairs to furnace superstructures formed of electrocast materials. They are of particular interest for the repair of glass furnaces reaching the end of a campaign and for which a conventional repair using a sacrificial protection of electrocast refractories is not possible.

The combustible particles, which serve as the fuel in the powder mixture, are preferably selected from silicon and aluminium. Their average particle size should be less than 50 µm and is preferably in the range 5 to 15 µm. The term "average particle size" is used herein to refer to the particle diameter above which 50% by weight of the particles have a greater diameter and below which 50% by weight have a smaller diameter. The total amount of combustible particles in the powder mixture is preferably in the range 8 to 15% by weight.

The total amount of refractory particles in the powder mixture is preferably at least 70% by weight, most preferably at least 75% by weight. Such high proportions assist in ensuring the production of a homogeneous repair mass. The proportion of any zirconia in the powder mixture should be at least 25% by weight, preferably at least 40% by weight, so as to assist in ensuring the heat-resistant properties of the repair mass. In addition to containing zirconia the powder mixture may contain other refractory materials, for example alumina or silica.

Convenient sources of the refractory particles are provided by alumina-zirconia eutectic alloys. The eutectic alloy is readily produced by electromelting. A preferred chemical composition of the alloy is given by the eutectic composition of approximately 55% $Al_2O_3$ and approximately 40% $ZrO_2$. Such an alloy is suitable for the repair of refractories in the family of AZS 41 electrocasts (approximate $ZrO_2$ content 41% by weight), which are especially resistant to corrosion by sodium/calcium glass.

If desired the abovementioned eutectic alloys can be used in combination with additional quantities of the refractory materials such as alumina, zirconia and silica.

The average particle size of the refractory oxides such as zirconia and alumina, if employed as discrete particles, is preferably in the range 100 to 200 µm. The maximum particle size of any silica employed as discrete particles in the powder mixture is preferably in the range 1.0 to 2.5 mm. In the case of the eutectic alloys the maximum particle size is preferably in the range 0.8 to 1.2 mm.

The use of a eutectic alloy of the type mentioned above permits the achievement of AZS masses with an improved dispersion of zirconia and alumina throughout the mass. It has also been observed that nodules of zirconia are found at the grain boundaries of the eutectic material. The benefits of using the eutectic alloy are therefore:

in the case of thermal variations, the improved dispersion prevents localised stresses in the material. In masses where the alumina (as corundum, $Al_2O_3$) and the zirconia were introduced separately these stresses may create micro-fissures around the particles of corundum;

in the case of contact with molten glass, the nodules of zirconia provide protection for the whole eutectic particle, there being no corundum particles in the weld which are not protected by zirconia.

The powder constituent which enhances the production of a vitreous phase in the repair mass is added in particulate form, preferably having an average particle size in the range of 100 to 500 µm. Preferred examples of the said constituent, also referred to herein as the "vitrifying agent", are sodium carbonate, sodium sulphate, sodium oxide, potassium carbonate, potassium sulphate and potassium oxide. In general the said constituent is preferably present in the vitreous phase as the oxide, which can be achieved either by adding it to the powder mixture as the oxide or by adding it as a salt which generates the oxide under the exothermic conditions at the repair surface.

The amount of the abovementioned vitrifying agents is preferably in the range 2 to 10% by weight of the powder mixture.

The vitreous phase as such in the repair mass is usually a silicate phase, although it can alternatively be formed by one or more oxides of boron or phosphorus.

When the combustible particles include silicon particles the product of the exothermic reaction with oxygen includes silica which is incorporated in the repair mass and can assist in the formation of a vitreous phase therein.

An alternative or additional vitrifying agent is provided by silica employed in an amount in excess of the amount notionally required as a refractory constituent of the powder mixture. The maximum particle size of the silica is preferably in the range 1.0 to 2.5 mm.

In one embodiment of the invention the formation of a repair mass from the powder mixture (the "first powder mixture") including at least one constituent which enhances the production of a vitreous phase therein is followed by the formation on the said repair mass of a further coherent refractory repair mass. In this embodiment the repair mass applied according to the invention serves as a base coating on the material to be repaired. The further coherent refractory mass thus forms a further coating, creating a sandwich of repair layers on the electrocast refractory surface. The base layer contains a vitreous phase but the second layer contains little or no vitreous phase. The powder mixture used to form the further coating should contain little or no vitrifying agent The invention will now be further described with reference to the following non-limiting examples.

EXAMPLE 1

A repair was effected to the tank blocks at the melting end of a glass melting furnace, without cooling the furnace. The blocks were highly refractory electrofused "Zac" bricks based on alumina and zirconia, with the following composition by weight: 50% alumina, 33% zirconia, 16% silica and approximately 1% sodium oxide. They were highly eroded, especially at the location of the surface of the molten glass bath where "flux line corrosion" had taken place. In order to permit access to this surface for repair, the level of molten glass was lowered by about 100 mm.

In order to carry out the repair, a stream of oxygen gas carrying an entrained powder mixture was projected on to the hot tank block. The powder mixture was made up as follows (% by weight), employing an excess amount of silica so as to serve as a vitrifying agent in the repair mass to be formed:

| | |
|---|---|
| silica | 32.3 |
| α-alumina (corundum) | 28.3 |
| stabilised zirconia | 27.0 |
| Si | 9.3 |
| Al | 3.0 |

The silicon and aluminium fuel particles had a nominal maximum particle size below 45 $\mu$m. The average particle size of the silicon was 6 $\mu$m. The average particle size of the aluminium was 5 $\mu$m. The average particle size of the zirconia was 150 $\mu$m and that of the alumina was 100 $\mu$m. The maximum particle size of the silica was 2 mm.

The mixture of particles dispersed in the carrier gas was sprayed by a lance. The block was at a temperature of approximately 1500° C. The mixture was sprayed at a flow rate of 30 kg/h with oxygen as the carrier gas at a rate of 30 Nm$^3$/h. The spraying continued until a refractory repair mass layer having a thickness of about 5 mm had been formed on the block.

A second repair layer was applied after completion of the first repair layer. In this case the powder stream to form the second layer was modified from that for the first layer, as follows (% by weight):

| | |
|---|---|
| Silica | 8.0 |
| α-alumina (corundum) | 42.0 |
| Stabilised zirconia | 42.0 |
| Si | 4.0 |
| Al | 4.0 |

The second powder mixture was sprayed under the same conditions as the first powder mixture until the further layer of refractory repair mass had built up over the first layer, to a total thickness such that the formed refractory repair mass reconstituted that part of the block which had become eroded, to return the block to its original profile.

The glass making furnace incorporating the repaired block was used in the normal manner and it was found that the repair was longer lasting than for a similarly damaged block repaired by a powder mixture with a constant level of silica therein.

EXAMPLE 2

A repair was effected to tank blocks of the a glass melting furnace. The blocks were of the type AZS 41 (41% $ZrO_2$), which is well known for its high resistance to molten glass. In this instance the powder mixture had the following composition, including as the vitrifying agent sodium carbonate with a particle size within the limits 100–500 $\mu$m, and including as the refractory particles zirconia with a particle size 125–250 $\mu$m and an electrocast eutectic alloy with a particle size greater than 300 $\mu$m, more than 40% of them in the range 350–425 $\mu$m and less than 30% of them in the range 425–500 $\mu$m. The alloy comprised, by weight, 55% $Al_2O_3$, 40% $ZrO_2$ and small quantities of $TiO_2$, $Fe_2O_3$, $HfO_2$ and $Na_2O$. The silicon and aluminium used as fuel had an average particle size of 10 $\mu$m.

| Primary material | Overall percentage |
|---|---|
| Eutectic alloy $Al_2O_3/ZrO_2$ | 73 |
| $ZrO_2$ | 10 |
| $Na_2CO_3$ | 5 |
| Si | 8 |
| Al | 4 |

The mixture was projected against a surface at a temperature of 1450° C. at a rate of 55 kg/hr in an oxygen stream of 27 Nm$^3$/hr. Microprobe analysis of samples of the repair mass showed results as in the following tables:

TABLE 1

Chemical analysis of the weld material

| | |
|---|---|
| $Al_2O_3$ | 43.0 |
| $ZrO_2$ | 40.0 |
| $SiO_2$ | 15.5 |
| $Na_2O$ | 1.5 |

TABLE 2

Microprobe analysis of the bonding phase of the weld material

| | |
|---|---|
| $Al_2O_3$ | 28.0 |
| $ZrO_2$ | 2.0 |
| $SiO_2$ | 61.0 |
| $Na_2O$ | 9.0 |

The repair material was found to have an expansion curve approaching that of electrocast AZS materials.

In addition to the good agreement between the overall expansion of the repair material and the refractory the samples also, and importantly, displayed compatible expansion in the bonding phase in the repair mass and substrate material. This compatibility permits the achievement of a good bond between the weld material and the refractory itself even after cooling to ambient temperature.

The example confirms the ability according to the invention to create a bonding phase with properties similar to those of the refractory substrate, thereby ensuring a good bond between the repair material and the refractory.

EXAMPLE 3

In a variation of the Example 2 procedure the powder mixture was replaced by the following and a repair process was effected as described in Example 2, achieving similarly good results.

| Primary material | Overall percentage |
| --- | --- |
| Eutectic alloy $Al_2O_3/ZrO_2$ | 74 |
| $ZrO_2$ | 10 |
| $Na_2CO_3$ | 5 |
| Si | 8 |
| Al | 3 |

EXAMPLE 4

In another variation of the Example 2 procedure the powder mixture was replaced by the following and used for a repair process on an AZS refractory material, again achieving good results.

| Primary material | Overall percentage |
| --- | --- |
| $Al_2O_3$ | 43 |
| $ZrO_2$ | 41 |
| $Na_2CO_3$ | 5 |
| Si | 8 |
| Al | 3 |

In a further variation the mixture of Example 2 was used to good effect for a repair on a spinel (alumina/zirconia) composition MONOFRAX-E®. The Example 2 mixture was similarly used to good effect for the repair of an electrocast material of the type AZSC.

EXAMPLE 5

A repair was effected to tank blocks with a very high zirconia content (95% $ZrO_2$, 5% binder), using a powder mixture with the composition, by weight:

| Stabilised zirconia | 83.0 |
| --- | --- |
| Si | 8.0 |
| $Na_2CO_3$ | 5.0 |
| Al | 4.0. |

The particle size of the stabilised zirconia was in the range 125–256 μm, and that of the sodium carbonate vitrifying agent was in the range 100–500 μm. The silicon and aluminium each had an average particle size of 10 μm.

The mixture was projected at a rate of 55 kg/hr in an oxygen stream of 27 $Nm^3$/hr against the surface, which was at a temperature of 1450° C. A coherent refractory mass was thereby formed on the surface and adhered well to it. The mass was as corrosion-resistant as the base refractory, making it particularly well suited to the repair of refractories exposed to corrosive glass such as the leaded glass in a crystal glass factory.

In a variant of this example the stabilised zirconia in the mixture was replaced by pure zirconia (baddeleyite), with similar results in terms of the quality of the deposited refractory mass.

These high zirconia content mixtures can be used to form a corrosion-resistant coating on AZS refractories with a lower zirconia content, for example to protect against corrosion in oxy-fuel glass furnaces. The coating composition can if necessary be progressively modified through the thickness of the formed mass by increasing the zirconia content in successive passes of the repair lance.

The example shows how the invention can be used to form refractory masses with a high zirconia content (greater than 80% $ZrO_2$), which is simply not possible with powder mixtures containing no vitrifying agent. In the absence of the vitrifying agent the formed mass is very fluid and tends to explode upon cooling.

What is claimed is:

1. A ceramic welding process for the formation of a coherent refractory repair mass on a surface of an electrocast refractory material, comprising:

providing an electrocast refractory material having a surface to be repaired;

providing a first powder mixture comprised of combustible particles, refractory particles in which at least part of the refractory particles are particles of an alumina-zirconia eutectic compound, and at least one constituent which enhances production of a vitreous phase in the coherent refractory repair mass, which is present in an amount effective to ensure the presence of the vitreous phase, and which is selected from the group consisting of sodium carbonate, sodium sulfate, sodium oxide, potassium carbonate, potassium sulfate, and potassium oxide; and projecting the first powder mixture in a gas stream containing oxygen against the surface to be repaired so that the combustible particles react with the projected oxygen against the surface in a highly exothermic manner and release sufficient heat of combustion to form a first coherent refractory repair mass.

2. The ceramic welding process as claimed in claim 1, wherein the alumina-zirconia eutectic compound has a composition by weight of about 55% $Al_2O_3$ and about 40% $ZrO_2$.

3. The ceramic welding process as claimed in claim 1, wherein the alumina-zirconia eutectic compound has a maximum particle size ranging from 0.8 to 1.2 mm.

4. The ceramic welding process as claimed in claim 1, wherein the refractory particles comprise the particles of alumina-zirconia eutectic compound in combination with additional quantities of other refractory materials.

5. A ceramic welding process for the formation of a coherent refractory repair mass on a surface of an electrocast refractory material, comprising:

providing an electrocast refractory material having a surface to be repaired;

providing a first powder mixture comprised of combustible particles, refractory particles, and at least one constituent which enhances production of a vitreous phase in the coherent refractory repair mass, which is present in an amount effective to ensure the presence of the vitreous phase, and which includes silica employed in an amount in excess of the amount required as a refractory constituent of the first powder; and projecting the first powder mixture in a gas stream containing oxygen against the surface to be repaired so that the combustible particles react with the projected oxygen against the surface in a highly exothermic manner and release sufficient heat of combustion to form a first coherent refractory repair mass;

providing a second powder mixture comprised of combustible particles, refractory particles, and optionally at least one constituent which enhances production of a vitreous phase in the coherent refractory repair mass which is the same at least one constituent as in the first powder mixture but which is present in the second powder mixture is a smaller amount than in the first powder mixture; and projecting the second powder mixture in a gas stream containing oxygen against the first coherent refractory repair mass so that the combustible particles react with the projected oxygen against the first coherent refractory repair mass in a highly exothermic manner and release sufficient heat of combustion to form a second coherent refractory repair mass.

6. The ceramic welding process as claimed in claim 5, wherein the silica has a maximum particle size ranging from 1.0 to 2.5 mm.

7. A powder mixture for formation of a coherent refractory repair mass on a surface of an electrocast refractory material in a ceramic welding process by projection thereof in a gas stream which contains oxygen against the surface where the combustible particles react against the surface in a highly exothermic manner with the projected oxygen and release sufficient heat of combustion to form the coherent refractory repair mass, the powder mixture comprising:

combustible particles;

refractory particles in which at least part of the refractory particles are particles of an alumina-zirconia eutectic compound; and at least one constituent which enhances the production of a vitreous phase in the repair mass, which is present in an amount effective to ensure the presence of the vitreous phase, and which is selected from the group consisting of sodium carbonate, sodium sulfate, sodium oxide, potassium carbonate, potassium sulfate, and potassium oxide.

8. The powder mixture as claimed in claim 7, wherein the alumina-zirconia eutectic compound has a composition by weight of about 55% $Al_2O_3$ and about 40% $ZrO_2$.

9. The powder mixture as claimed in claim 7, wherein the alumina-zirconia eutectic compound has a maximum particle size ranging from 0.8 to 1.2 mm.

10. The powder mixture as claimed in claim 7, wherein the refractory particles comprise the particles of alumina-zirconia eutectic compound in combination with additional quantities of other refractory materials.

* * * * *